May 26, 1942.   L. R. OWEN   2,284,299
TIRE DISPLAY STAND
Filed April 1, 1940   2 Sheets-Sheet 1
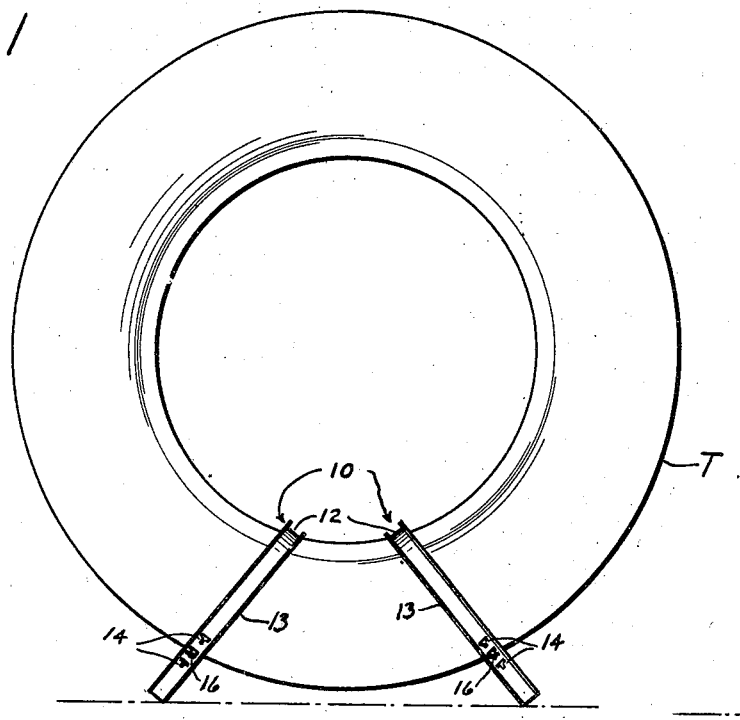
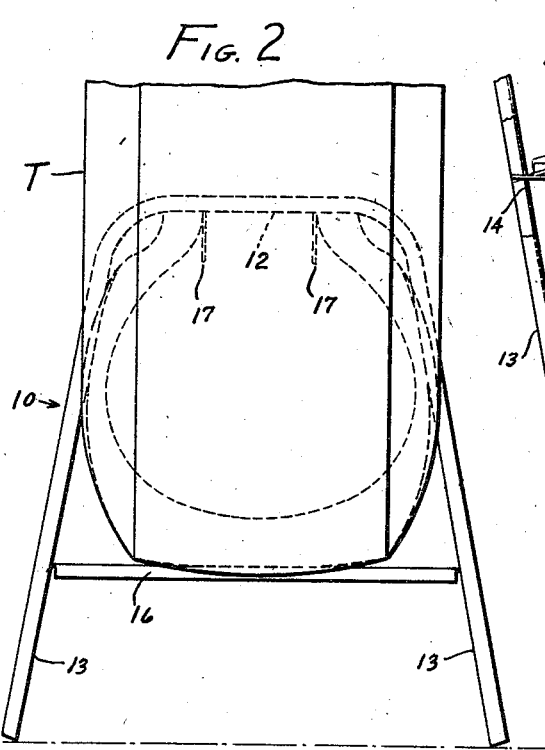
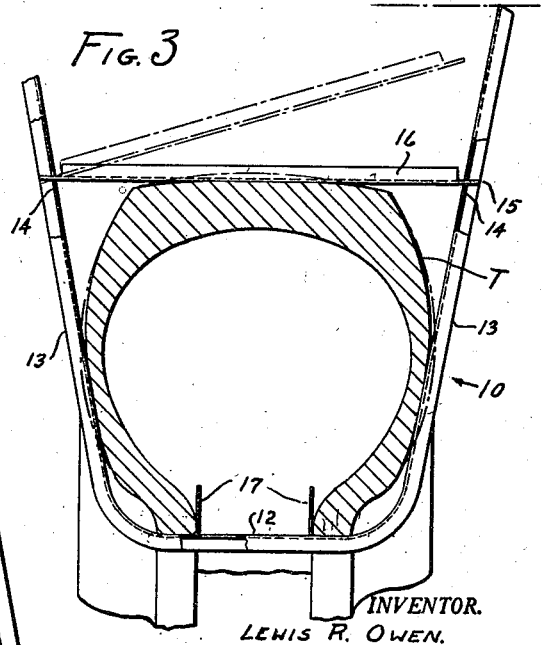
INVENTOR.
LEWIS R. OWEN.
BY
Ralph Barrow May 26, 1942.　　　　L. R. OWEN　　　　2,284,299
TIRE DISPLAY STAND
Filed April 1, 1940　　　　2 Sheets-Sheet 2
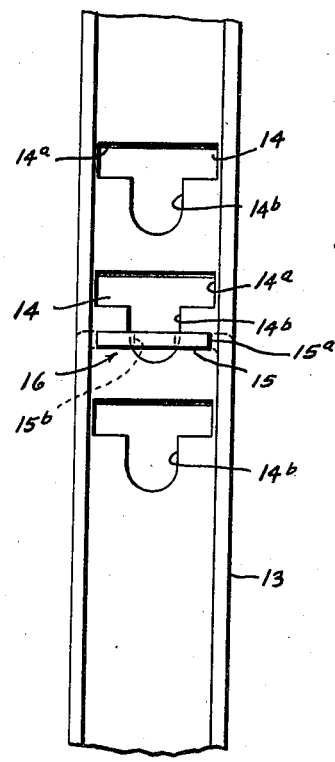
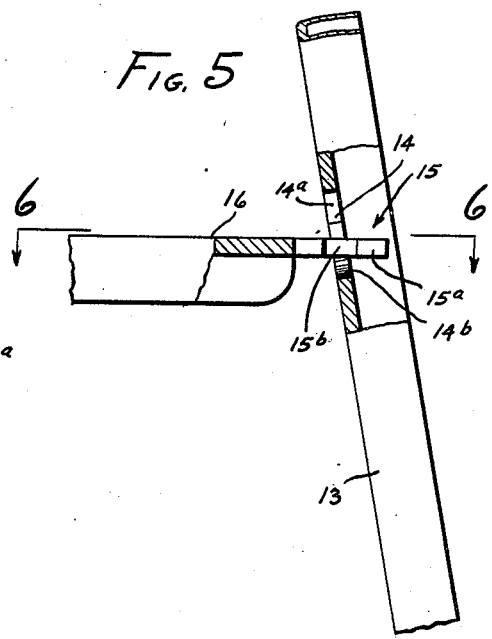
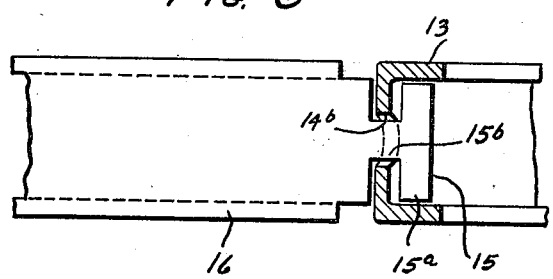
INVENTOR.
LEWIS R. OWEN.
BY
Ralph Barrow Patented May 26, 1942

2,284,299

UNITED STATES PATENT OFFICE 2,284,299

TIRE-DISPLAY STAND

Lewis R. Owen, Cuyahoga Falls, Ohio

Application April 1, 1940, Serial No. 327,241

11 Claims. (Cl. 211—24)

This invention relates to tire-display stands.

A purpose of this invention is to provide a tire-display stand which is of simple, compact structure, and which may be manufactured without appreciable waste of material.

Another object of the invention is to provide a tire-display stand which will permit the tire supported thereon to be moved from one location to another for display purposes, or for convenience, with the stand retained on the tire.

A further object of the invention is to provide such a stand which will not materially detract from or obstruct the general appearance of the tire.

Another object of the invention is to provide such a tire-display stand from which the tire will not be displaced or removed, should the tire be knocked over or otherwise abused.

Still another object of the invention is to provide in such a tire-display stand, means for preventing a tire from tilting relative to the stand, and thereby to prevent upsetting the tire when it is set on the stand at substantial angles toward unbalanced equilibrium of the tire and stand.

These and other objects of the invention will be manifest from the following brief description and the accompanying drawings.

Of the accompanying drawings:

Figure 1 is a side elevation illustrating a tire supported on the improved display stand.

Figure 2 is an end view thereof, greatly enlarged and partly broken away.

Figure 3 is a radial cross-section through a tire section, illustrating a method of applying the display stand onto a tire.

Figure 4 is an enlarged fragmentary detail view, partly broken away and in section, of the releasable connection between the cross-piece and the supporting member.

Figure 5 is an end view of Figure 4, as viewed from the left thereof.

Figure 6 is a cross-section taken on line 6—6 of Figure 5.

Referring particularly to Figures 1 and 2 of the drawings, the letter T designates a pneumatic tire supported in upright position, by means of a pair of supporting members 10, 10, releasably retained thereon in circumferentially spaced relation, as will be described.

Each member 10 may be formed from a strip of channel material, substantially in the shape of an inverted U, as shown in Figure 2, with a transversely extending flat portion 12 for engaging across the beads of the tire T, and with downwardly diverging supporting legs or elements 13, 13, these legs being spaced to be yieldingly engageable with opposite side-wall portions of the tire.

As best shown in Figures 3, 4 and 5, one or more T-shaped openings 14, 14 may be provided in each leg 13, these openings having transverse slots 14a for receiving heads or bars 15a of T-shaped formations 15 on the ends of a cross-piece 16, to permit engagement of a relatively narrow neck or stem portion 15b of said T-shaped ends of the cross-piece to be urged downwardly into a narrow recess 14b in openings 14, and thereby releasably to connect the cross-piece between said legs 13. The stem portions 15b may be relatively narrower than recess 14b to permit the cross-piece 16 to pivot thereon and thereby to conform a flat upper face of the cross-piece to the tread portion of the tire when member 10 is engaged on the tire.

A pair of spaced lugs 17, 17, may be provided to extend downwardly from the flat portions 12 of the member 10, for engaging opposite inner edge portions of the tire beads (see Figures 2 and 3), thereby to prevent relative rotation of lateral tilting movement of a tire supported by the member.

As best shown in Figure 3, the supporting members 10 are most readily applied on a tire at the top edge thereof with the bottom edge of the tire engaging the ground or floor surface. In this manner, the member 10 is first applied with the lugs 17 engaged between the beads of the tire and the legs 13 extending upwardly and substantially radially of the center of the tire. The locking device 15 at one end of the cross-piece 16 may then be engaged in the T-shaped opening 14 of one of the legs, so that leverage may be applied to the cross-piece against the inherent yielding resistance of the tire, to permit engagement of locking device 15 at the other end of the cross-piece in the cooperating T-shaped opening 14 in the other leg 13, the legs 13 being yieldingly held apart to permit this reception of the ends of the cross-piece in the T-shaped openings 14. The tendency of the tire section to resume normal shape will yieldingly urge the cross-piece 16 upwardly to engage the stems 15b thereof in locked positions in the recesses 14b of the respective supporting legs 13.

When both supporting members 10 are thus yieldingly engaged or clamped in positions around the cross-section of the tire, in circumferentially spaced relation, and the tire is placed to be supported on the members, as shown in Figure 1, it will be seen that downward pressure on the tire will tend to spread the members farther apart at the lower ends thereof, as limited by the locked engagement of the ends of the cross-piece 16 with the legs 13. This, however, tends further to wedge the members 10 on the tire so that they will become more firmly clamped thereon.

Thus has been provided a simple, compact and durable tire-display stand which is economical to manufacture. The compactness of the supporting members or units 10 is particularly advantageous in that they may be packed or stored in relatively small space. Furthermore, should one of the members or units become damaged or lost, only that unit need be replaced. The construction of members 10 is such that they will not obstruct any substantial portion of the side walls of the tire, and therefore will not detract materially from the general appearance of the tire.

The improved tire-display stand readily adapts itself for advertising purposes. For example, an advertising sign (not shown) may be connected in any suitable manner between the members 10, in which case the sign may be utilized to aid in setting the members on the tire at a predetermined distance apart for best bracing action.

Modifications of the invention may be resorted to without departing from the spirit thereof or the scope of the appended claims.

What is claimed is:

1. A display stand for pneumatic tires comprising a member formed with a tire-bead engaging portion and laterally spaced side portions extending longitudinally therefrom to be disposed at opposite sides of a tire to be supported, said bead-engaging portion rigidly connecting between said spaced portions, a cross-piece extending between said side portions of the member for engaging the tread portion of said tire, and means on said cross-piece and said side portions for releasably securing the cross-piece between the side portions to retain the member on the tire.

2. A tire-display stand comprising a member formed with a tire-bead engaging portion and spaced side portions arranged to be disposed at opposite sides of a tire to be supported, a cross-piece extending between said side portions for engaging the tread portion of said tire, means for releasably securing said element to said side portions of said member, and means on said bead engaging portion for engaging between the beads of said tire to prevent the tire from tilting relative to said member.

3. A tire-display stand comprising a member formed substantially U-shaped to provide a tire-bead engaging cross-member and laterally spaced supporting elements extending longitudinally therefrom for engaging opposite sides of a tire received in said U-shaped member to be supported thereby, a cross-piece extending between said supporting elements in longitudinally spaced relation to said cross-member for engaging the tread portion of said tire, and cooperating means on said cross-piece and said supporting elements for releasably securing the cross-piece between said elements.

4. A tire-display stand comprising a substantially U-shaped member including a tire-bead engaging portion and spaced supporting elements for engaging opposite sides of a tire to be supported, a cross-piece extending between said supporting elements for engaging the tread portion of said tire, and cooperating means on said cross-piece and said member for releasably securing the cross-piece between said elements, said cooperating means including a locking device operable by the inherent resiliency of a tire engaged between the cross-piece and said bead engaging portion of the member to lock said cross-piece in said secured position.

5. A tire-display stand comprising a substantially U-shaped member including a tire-bead engaging portion and spaced supporting elements for engaging opposite sides of a tire to be supported, a cross-piece extending between said supporting elements for engaging the tread portion of said tire, cooperating means on said cross-piece and said member for releasably securing the cross-piece between said elements, and means on said bead-engaging portion for engaging opposite edges of the tire-beads to prevent tilting of said tire relative to said member.

6. A tire-display stand comprising a pair of supporting members, each of said members including laterally spaced side portions for engaging opposite sides of a tire, a pair of longitudinally spaced elements connecting between said laterally spaced side portions for engaging the bead and tread portions of the tire against the inherent resiliency or elasticity of the tire, said member and one of said longitudinally spaced elements thereof having cooperating means for releasably securing the same between said laterally spaced side portions of the member, whereby said members may be releasably secured in circumferentially spaced relation on a tire to support the same.

7. A tire-display stand comprising a pair of supporting members, each of said members including spaced portions for engaging opposite sides of a tire, a pair of spaced elements relatively rigidly connecting between said side portions for engaging the bead and tread portions of the tire against the inherent resiliency or elasticity thereof, said bead-engaging element having means for engaging the inner edges of the tire beads to prevent tilting of the tire relative to the members, and means for releasably securing one of said elements of the member between said side portions thereof, whereby said members may be releasably secured in circumferentially spaced relation on a tire to support the same.

8. A tire-display stand comprising a pair of supporting members, each member including a tire-bead engaging portion and spaced side portions for engaging the sides of a tire, a cross-piece, and means for releasably connecting said cross-piece between said side portions to engage the tread portion of said tire against the inherent resiliency or elasticity of the tire, whereby said pair of members may be releasably secured in circumferentially spaced relation on a tire to support the same.

9. A tire display stand comprising a substantially U-shaped member including a tire-bead engaging portion and spaced supporting elements for engaging opposite sides of a tire to be supported, a cross-piece extending between said supporting elements for engaging the tread portion of said tire, and cooperating means on said cross-piece and on said member for releasably securing the cross-piece between said elements in various positions longitudinally of the member, whereby the cross-piece may be readily adjusted on said member to accommodate tires of different sizes.

10. A tire-display stand comprising a supporting member having longitudinally extending, laterally spaced side portions to be disposed at opposite sides of a pneumatic tire to be supported and longitudinally spaced portions extending between said laterally spaced side portions substantially in a plane therewith for engaging the usual bead and tread portions of the tire, and means on said member for releasably clamping the same in embraced relation around the cross-section of the tire against the inherent resiliency thereof, said member having ground-engaging means thereon for supporting the same in laterally braced condition, said supporting member being adapted to be releasably clamped on a tire in circumferentially spaced relation to a like supporting member to support the tire in upright position.

11. A tire-display stand comprising a supporting member having longitudinally extending, laterally spaced side portions adapted to be disposed at opposite sides of a tire to be supported, and having longitudinally spaced portions between said side portions for engaging the bead and the tread portions of the tire against the inherent resiliency thereof, one of said longitudinally spaced portions comprising an element shiftable relatively of the other to permit mounting the member on the tire, and means on said element and on said side portions for releasably securing the element to said supporting member releasably and removably to retain the member on the tire.

LEWIS R. OWEN.